United States Patent
Hildenbrand et al.

(10) Patent No.: US 9,004,228 B2
(45) Date of Patent: Apr. 14, 2015

(54) CONTAINER FOR COLLECTING WASTE LUBRICANT

(71) Applicants: Thomas Hildenbrand, Bad Brueckenau (DE); Egon Eisenbacher, Karlstadt (DE)

(72) Inventors: Thomas Hildenbrand, Bad Brueckenau (DE); Egon Eisenbacher, Karlstadt (DE)

(73) Assignee: Perma-Tec GmbH & Co. KG, Euerdorf (DE)

( * ) Notice: Subject to any disclaimer, the term of this patent is extended or adjusted under 35 U.S.C. 154(b) by 119 days.

(21) Appl. No.: 13/621,935

(22) Filed: Sep. 18, 2012

(65) Prior Publication Data

US 2013/0206511 A1 Aug. 15, 2013

(30) Foreign Application Priority Data

Sep. 20, 2011 (DE) ................... 20 2011 051 373 U

(51) Int. Cl.
*F16N 19/00* (2006.01)
*F16N 11/08* (2006.01)

(52) U.S. Cl.
CPC ............... *F16N 19/00* (2013.01); *F16N 11/08* (2013.01)

(58) Field of Classification Search
CPC .......... F16N 7/32; F16N 19/00; F16N 31/00; F16N 11/08; F01M 11/0458; B23Q 11/1046
USPC ............... 184/5.1, 6.4, 37, 105.1, 106, 26, 7; 141/325, 327
See application file for complete search history.

(56) References Cited

U.S. PATENT DOCUMENTS

| | | | |
|---|---|---|---|
| 4,921,071 A * | 5/1990 | Lonnborg et al. | 184/6.4 |
| 5,634,531 A * | 6/1997 | Graf et al. | 184/37 |
| 8,371,469 B2 * | 2/2013 | Takedutsumi et al. | 220/495.05 |
| 2002/0079336 A1 * | 6/2002 | Weigand et al. | 222/389 |
| 2006/0049000 A1 * | 3/2006 | Boelkins et al. | 184/7.4 |
| 2012/0103465 A1 | 5/2012 | Paluncic | |
| 2012/0132484 A1 * | 5/2012 | Guillaume et al. | 184/37 |
| 2012/0272667 A1 * | 11/2012 | Ferraro et al. | 62/77 |
| 2013/0327790 A1 * | 12/2013 | Ryan | 222/95 |

* cited by examiner

*Primary Examiner* — William E Dondero
*Assistant Examiner* — Robert T Reese
(74) *Attorney, Agent, or Firm* — Andrew Wilford

(57) ABSTRACT

A container for collecting a liquid lubricant has a housing having one end formed with an inlet opening connectable to a source of the liquid lubricant and an opposite end formed with a vent hole, with a piston inside the housing subdividing the housing into a front lubricant compartment into which the inlet opening opens and a rear compartment into which the vent hole opens. The piston is shiftable between a front position close to the intake opening and a rear position close to the vent hole such that as the liquid lubricant fills the lubricant compartment the piston moves into the rear position. Formations on the piston and on the housing seal between the piston and the housing around the vent hole only when the piston is in the rear position.

8 Claims, 1 Drawing Sheet

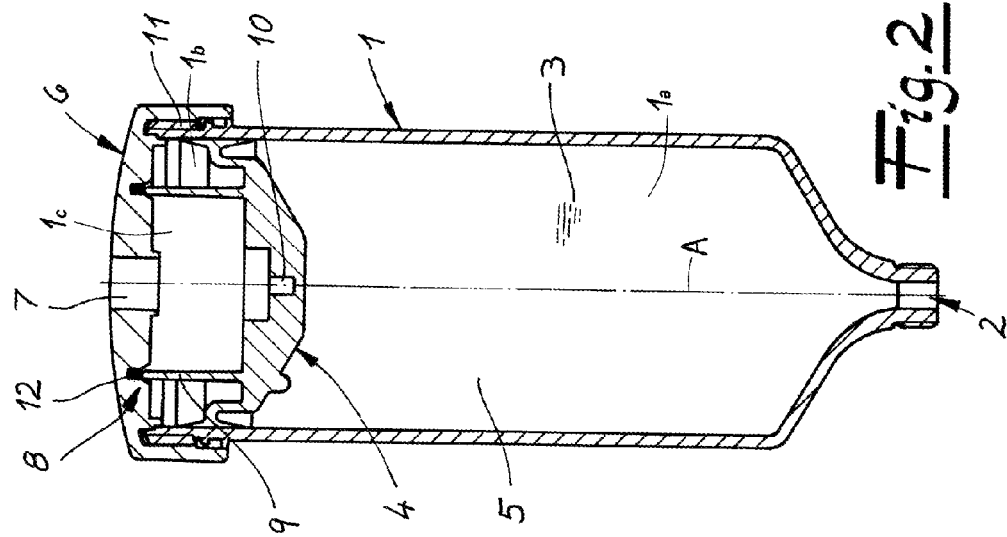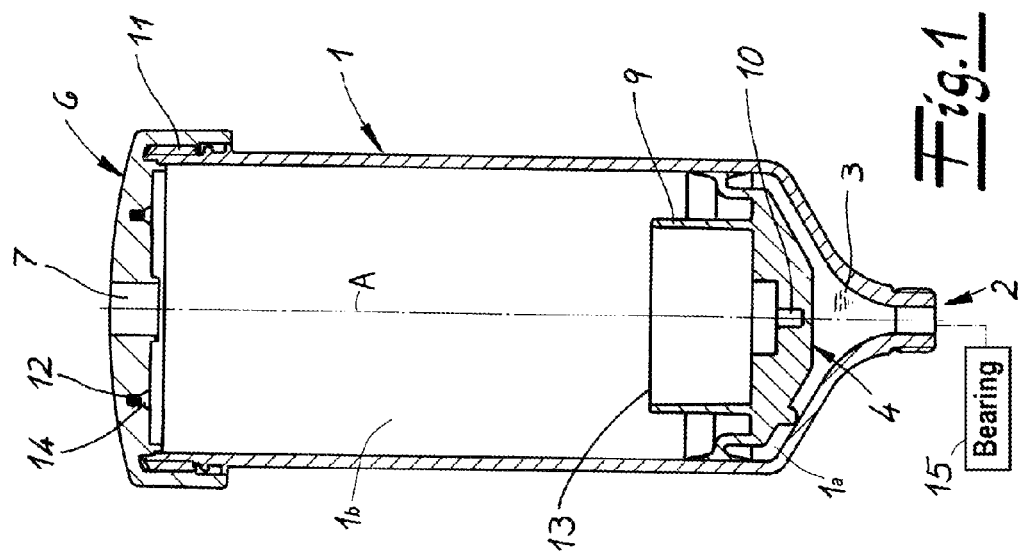

CONTAINER FOR COLLECTING WASTE LUBRICANT

FIELD OF THE INVENTION

The present invention relates to a lubricant-collecting container. More particularly this invention concerns such a container connected to a bearing to catch excess lubricant.

BACKGROUND OF THE INVENTION

Such a container as described in US patent publication 2012/0103465 has a cylindrical housing having one end formed with an intake opening connected to the source of liquid lubricant, typically a bearing connected to an automatic lubricant doser. In one embodiment a piston subdivides the container into a front compartment into which the intake opening opens and a back compartment that is open to the outside through the wide-open rear end of the container. The piston can thus be moved back as the compartment fills until it engages stops preventing further movement. In another embodiment the rear end of the container is covered with a cap having a vent hole and instead of a piston a bladder inside the container is compressed as the front compartment fills.

The problem with the piston system is that if the collecting container is filled with lubricant and lubricant continues to flow, the lubricant can escape out of the collecting container past the piston. This is in particular a problem when a piston has to be built so that it can be moved particularly easily, that is with the lowest pressure difference and thus with low seal pressing and the old lubricant due to thermal stress and pressure stress tends to bleed out, that is, to segregate oil portions.

The disadvantage of the system with the membrane is that, after being filled, the collecting container cannot be emptied again or can be emptied again only with effort.

OBJECTS OF THE INVENTION

It is therefore an object of the present invention to is provide an improved container for collecting lubricant.

Another object is the provision of such an improved container for collecting lubricant that overcomes the above-given disadvantages, in particular that is relatively leak proof, but that can also easily be emptied if desired.

SUMMARY OF THE INVENTION

A container for collecting a liquid lubricant has according to the invention a housing having one end formed with an inlet opening connectable to a source of the liquid lubricant and an opposite end formed with a vent hole, with a piston inside the housing subdividing the housing into a front lubricant compartment into which the inlet opening opens and a rear compartment into which the vent hole opens. The piston is shiftable between a front position close to the intake opening and a rear position close to the vent hole such that as the liquid lubricant fills the lubricant compartment the piston moves into the rear position. According to the invention seal formations on the piston and on the housing seal between the piston and the housing around the vent hole only when the piston is in the rear position.

The sealing arrangement comprises in particular a sealing surface as well as an elastomer seal, the sealing surface being formed on the rear of the piston or on the underside of the cover and, after complete filling of the lubricant collecting container, bearing against the elastomer seal. In this manner the lubricant collecting container is effectively sealed in the filled condition. The sealing of the piston inside the housing is not critical, so that the piston can be arranged moveably in the housing in a smooth-running manner and with low circumferential seal pressing that inherently allows minor leakage between the outer edge of the piston and the cylindrical inner surface of the container's housing.

According to a particularly preferred embodiment of the collecting container according to the invention, the cover has an annular groove facing toward the inlet opening and an annular projection is formed on the rear side of the piston. This annular projection, after complete filling of the collecting container, engages in the groove and is bears thereon. Advantageously, an elastomeric ring seal is provided in the sealing groove.

In the arrangement according to the invention the vent opening is provided in a cover or end cap of the container to ensure that air in the back compartment of the container can escape out of the container as the piston shifts rearward. Furthermore, the piston is moveable in the collecting container in a very smooth-running manner, preferably with a pressure differential across the piston of less than 0.2 bar. Even with rising pressure of the lubricant in the collecting container, after the piston strikes the cover, an effective sealing is ensured, since the cover that the piston presses against is firmly connected to the housing. The connection between the housing and the cover can be permanent or detachable. Preferably, the cover is connected to the housing by a screwthread. It is also conceivable that the cover and the housing are glued or permanently connected to one another by friction welding.

In accordance with the invention the back side of the piston facing toward the vent opening has a tool-receiving socket. To empty the collecting container, it is possible to insert a suitable tool through the vent opening and fit it into the tool-receiving socket. The piston can then be pressed down by means of the tool.

BRIEF DESCRIPTION OF THE DRAWING

The above and other objects, features, and advantages will become more readily apparent from the following description, reference being made to the accompanying drawing in which:

FIG. 1 is a partly schematic vertical section through the container according to the invention when empty; and FIG. 2 is a view like FIG. 1, but when full.

DETAILED DESCRIPTION

A container for collecting excess or waste liquid lubricant is formed as a cylindrical housing 1 centered on a normally upright axis A and having a inwardly tapered lower end forming an inlet opening 2 connected as shown schematically in FIG. 1 to a bearing 15. At its upper end the cylindrical housing 1 is closed by a cap 6 having a central throughgoing vent hole 7 and secured releasably in place by a screwthread 11.

A piston 4 of very light construction subdivides the interior 5 of the housing 1 into a lower waste compartment 1a normally filled with a mass or body 3 of the waste liquid lubricant from the bearing 15 and an upper compartment 1b that is normally open to the outside via the vent hole 7. The piston 4 has circular outer lips that engage radially outwardly against the cylindrical inner surface of the housing 1 and can slide freely between the lower position shown in FIG. 1 in which the compartment 1a is of minimal volume and the compartment 1b is of maximal volume and the upper position of FIG. 2 in which the lower compartment 1a is of maximal volume and the upper compartment 1b is of minimal volume. The piston 4 is of such light construction that a pressure differential between the compartments 1a and 1b of 0.2 bar is enough to move it.

According to the invention seal means 8 is provided to ensure isolation of the vent hole 7 from the compartment 1b when the piston 4 is in the outer end position of FIG. 2, in which position further rearward travel is blocked by the end cap 6. This seal 8 is formed by an axially rearwardly projecting and cylindrically annular rim 9 formed on the back face of the piston 4 centered on the axis A and having a rear edge 13 lying in a plane perpendicular to the axis A, and by a seal ring 12 set in an axially inwardly open circular groove 14 formed in the cap 6 and centered on the axis A. The edge 13 and seal ring 12 are of identical diameter so that, when the piston 4 has moved into its upper or outer end position as shown in FIG. 2, they engage each other and form a compartment 1c communicating with the outside via the hole 7 but isolated from the compartment 1b behind the piston 4.

Furthermore FIG. 2 shows how the piston 4 is formed with a rearwardly open socket 10 centered on the axis A and aligned with the hole 7. This makes it possible, once the container is full of the lubricant 3, to empty the housing 1 by inserting a tool into the hole 7, fitting it to the socket 10, and pushing the piston 4 down in the housing 1 so as to force the lubricant back out the intake opening 2. Due to the double seal provided between the front lubricant compartment 1a and the vent hole 7, that is a first seal between the piston periphery and the wall of the housing 1 and a second seal between the edge 13 and the ring seal 12, the tool used for emptying the container is not being dipped into dirty oil.

We claim:

1. A container for collecting a liquid lubricant, the container comprising:
    a housing having one end formed with an inlet opening connectable to a source of the liquid lubricant, an inner surface, and an opposite end;
    a cap closing the opposite end and formed with a vent hole open to the exterior;
    a piston shiftable along an axis inside the housing, sealingly engaging the inner surface of the housing, subdividing the housing into a front lubricant compartment into which the inlet opening opens and a rear compartment into which the vent hole opens, the piston being slidable on the inner surface of the housing between a front position close to the intake opening and a rear position close to the vent hole such that as the liquid lubricant fills the front lubricant compartment the piston moves into the rear position and expels air from the rear compartment through the vent hole;
    a cap seal formation on the cap; and
    a piston seal formation on the piston axially engageable with the cap seal formation for sealing between the piston and the housing around the vent hole only when the piston is in the rear position, one of the formations being an annular seal surface and the other of the formations being an elastomeric seal ring engageable with the annular seal surface only in the rear position of the piston.

2. The lubricant-collecting container defined in claim 1, further comprising:
    an annular ridge having an outer edge forming the annular seal surface.

3. The lubricant-collecting container defined in claim 2, wherein the ridge is formed on a rear side of the piston and the edge is substantially circular and centered on an axis of the housing.

4. The lubricant-collecting container defined in claim 3, wherein the cap is formed with an annular groove generally complementary to the ridge and the annular seal is seated in the groove.

5. The lubricant-collecting container defined in claim 1, further comprising interfitting screwthreads on the cap and on the housing releasably securing the cap to the housing.

6. The lubricant-collecting container defined in claim 1, wherein the housing is cylindrical and centered on an axis, the piston being axially shiftable in the housing.

7. The lubricant-collecting container defined in claim 1, wherein a back side of the piston is formed on the axis with a rearwardly open socket aligned with the vent hole, whereby a tool can be fitted through the vent hole with the socket to push the piston from the rear position to the front position.

8. The lubricant-collecting container defined in claim 1, wherein the cap is permanently fixed on the housing.

\* \* \* \* \*